(12) United States Patent
Storz

(10) Patent No.: US 6,271,894 B1
(45) Date of Patent: Aug. 7, 2001

(54) ARRANGEMENT FOR SETTING AN IMAGE DISPLAY DEVICE WITH A HOUSING

(75) Inventor: Martin Storz, Villingen-Schwenningen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 08/976,677

(22) Filed: Nov. 24, 1997

Related U.S. Application Data

(63) Continuation of application No. 08/511,496, filed on Aug. 4, 1995, now abandoned.

(30) Foreign Application Priority Data

Aug. 17, 1994 (DE) .................................................. 44 29 060

(51) Int. Cl.$^7$ .................................................. H04N 5/64
(52) U.S. Cl. .................................................. 348/836
(58) Field of Search .................................................. 348/836, 837; 248/276.1, 920, 921, 923, 913; 359/822, 83, 813, 823, 896, 818, 811; 361/756, 681, 726

(56) References Cited

U.S. PATENT DOCUMENTS

| | | | |
|---|---|---|---|
| 3,816,646 | * 6/1974 | Cinque | 348/836 |
| 4,386,372 | 5/1983 | Slater | 348/782 |
| 4,825,295 | * 4/1989 | Ishikawa et al. | 348/836 |
| 5,177,644 | * 1/1993 | Stark | 359/896 |
| 5,194,993 | * 3/1993 | Bedzyk | 359/813 |
| 5,196,963 | * 3/1993 | Sato et al. | 359/822 |
| 5,220,460 | * 6/1993 | Bedzyk | 359/813 |
| 5,237,399 | 8/1993 | Inada et al. | 348/761 |
| 5,465,126 | * 11/1995 | Fukuda | 359/813 |

FOREIGN PATENT DOCUMENTS

| | | | |
|---|---|---|---|
| 4204511A1 | 8/1993 | (DE) | H04N/5/64 |
| 0409246A2 | 9/1991 | (EP) | H04N/5/74 |
| 2108700A | 5/1983 | (GB) . | |

OTHER PUBLICATIONS

Search Report Jan. 18, 1995.

* cited by examiner

Primary Examiner—Cheukfan Lee
(74) Attorney, Agent, or Firm—J. S. Tripoli; F. A. Wein

(57) ABSTRACT

According to the invention, parts of the setting mechanism are integrated into the housing and/or setting mechanisms are arranged in such a way that they assume not only the setting function of one axis but also the guiding function of a further axis. The setting mechanisms are formed by eccentric bolts. Guiding pins serve for guidance in one axis. Clamping screws serve for fixing the adjusted axes. Slots serve as guiding aids in the various axes.

8 Claims, 1 Drawing Sheet

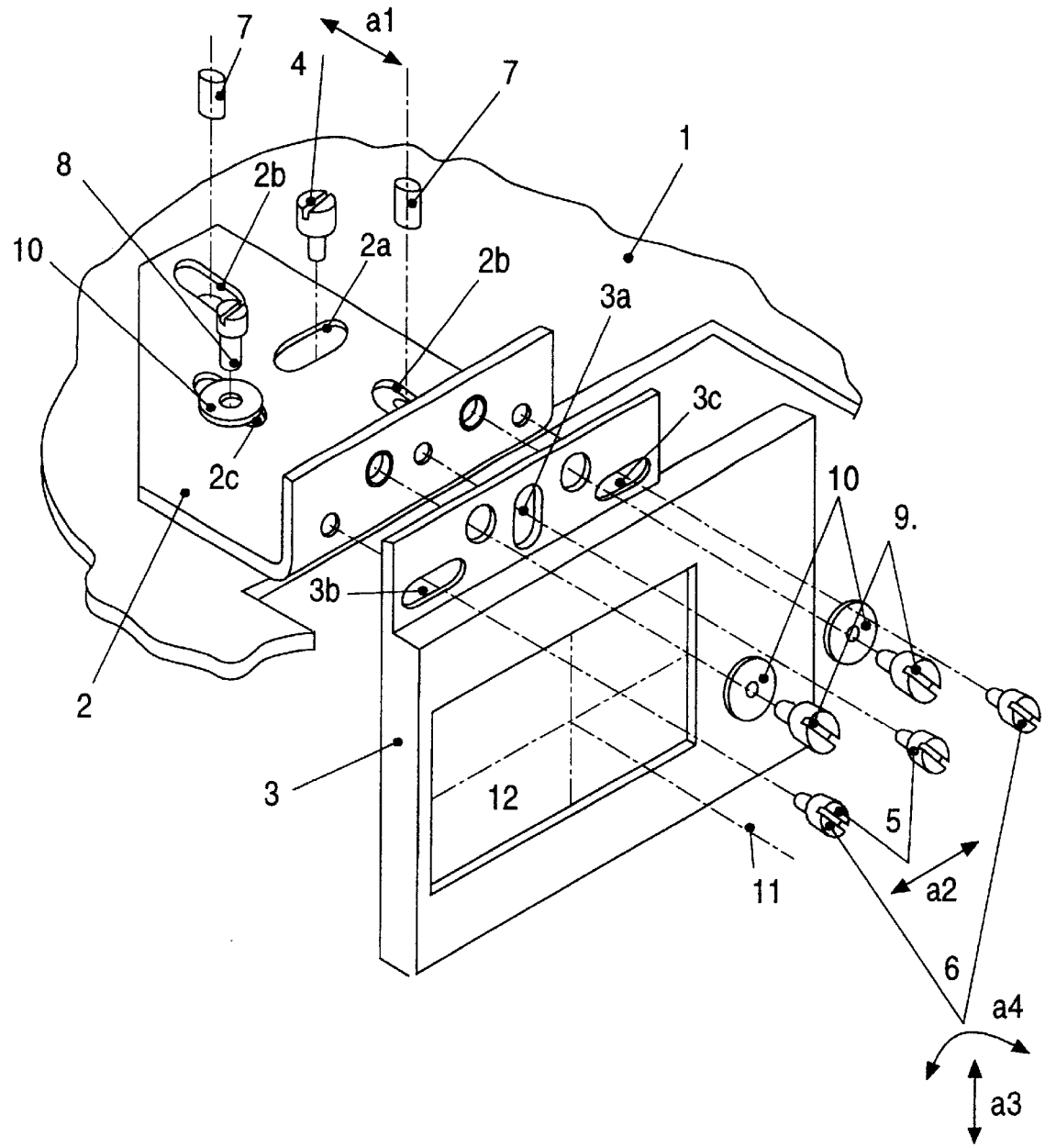

ARRANGEMENT FOR SETTING AN IMAGE DISPLAY DEVICE WITH A HOUSING

This is a continuation of application Ser. No. 08/511,496, filed Aug. 4, 1995 now abandoned.

The invention is based on an arrangement for setting an image display device with a housing.

Known solutions comprise sheet-metal parts to which there are assigned in each case setting parts eccentric or threaded bolts) and guiding parts (clinched bolts, pins and/or levers). One sheet-metal part with the corresponding setting or guiding parts is necessary for each setting direction (axis). Therefore, for a setting mechanism of the known type, four such sheet-metal parts are necessary and are assigned to one another in a layered manner. This produces a very complex mechanical construction, which relies on very accurate individual parts and extremely careful assembly. Also disadvantageous is the tolerance limit due to the many individual components. The great space requirement makes a compact design difficult and increases the costs of the lens, because a relatively great back focus is required. The amount of tooling is great and assembly is complicated.

The invention is based on the object of simplifying a setting mechanism of an image display device.

According to the invention, parts of the setting mechanism are integrated into the housing and/or setting means are arranged in such a way that they assume not only the setting function of one axis but also the guiding function of a further axis. Setting with the setting means is made possible in a number of axes, preferably in four axes. The setting means are formed by eccentric bolts. Guiding pins serve for guidance in one axis. Clamping screws serve for fixing the adjusted axes. Slots serve as guiding aids in the various axes.

With the first eccentric bolt it is possible to displace a first axis in the horizontal, rearward and forward direction. With the second eccentric bolt, a displacement of the second axis is possible in the horizontal, right and left direction. With the third eccentric bolt it is possible to set the further two axes vertically and radially.

In a projection television set, a plurality of image display devices are used. These image display devices are formed, in particular, from an LCD (Liquid Crystal Display), also known as an LCD light valve. To permit congruent projection of the channels red, green, blue it is necessary to perform an adjustment and fixing of the LCDs. Advantageous in the case of the solution according to the invention is the simple construction with an absolute minimum of individual parts, simple assembly and clearly arranged setting device. Minimal cumulative tolerances, no individual precision parts (no close bearing tolerances) are required. A compact design, since the setting mechanism is outside the optical channel.

In LCD projectors, the light generated by the illuminating device is split into three light channels (red, green, blue) with the aid of dichroic mirrors. In each channel there is a monochromatic LCD light valve. Between the LCDs and the projection lens, these three channels are brought together again by dichroic mirrors and are projected via a projection lens onto a projection surface (projection screen or ground-glass screen). The three partial images then produce a colour image by additive colour mixing. A prerequisite for this is a congruent positional setting of the LCDs. This LCD setting is performed in 4 axes:

distance of the LCDs from the projection lens (picture definition setting)
setting lines horizontally
setting vertical position
setting lateral position.

With such a device, the required setting accuracy is about ¼ of the pixel size. (In the case of a 2" LCD 16:9 820×560 pixels, the pixel size is 56 m×46 m.) This setting is fixed by clamping screws and is retained throughout the entire service life of the LCD.

This arrangement and multifunctional assignment of the eccentrics makes it possible to dispense with further complicated sheet-metal parts.

The invention is explained below with reference to the drawing.

The FIGURE shows the exploded drawing of an image display device 12 with the housing 3 and the associated fastening and setting devices. An LCD light valve has a housing, in order on the one hand to hold and protect all the internal functional groups and in order on the other hand to permit a fastening of the light valve in the projector. If functions of the setting mechanism are then also integrated into the housing part which ensures fastening, in the case of the solution according to the invention there is an insignificant extra effort of providing three slots 3a, 3b, 3c. The LCD light valve 3 is connected to the projector baseplate 1 with the aid of a sheet-metal bracket 2. To permit a 4-axes adjustment, sheet-metal bracket 2 and light valve 3 have slots, to which eccentric bolts, guiding pins and fixing screws are assigned.

Setting the picture definition: the sheet-metal bracket 2 is guided along the optical axis 11 with the aid of the guiding pins 7 fastened in the baseplate 1. The eccentric bolt 4 is rotatably fastened in the baseplate and engages in the slot 2a of the sheet-metal bracket 2. A turning of the eccentric bolt 4 effects a displacement of the light valve 3 along the optical axis 11. After setting the definition, the sheet-metal bracket 2 is fixed on the baseplate 1 with the aid of at least one clamping screw 8.

Setting of vertical position, horizontal and lateral position: the setting of the vertical position and of the horizontal position is performed in one and the same operation by turning the eccentric 6. Eccentric 5 in this case forms the guide for the vertical setting and at the same time the turning point for the horizontal setting. The setting of the lateral position is performed by turning the eccentric 5. In this case, the eccentric 6 forms the guide. Once the setting has been made, the position of the light valve 3 with respect to the sheet-metal bracket 2 is fixed with the aid of two clamping screws 9.

What is claimed is:

1. An arrangement for setting an image display device with a housing for a projection television receiver, comprising first and second members of a setting means;
   wherein one of the first members being integrated into the housing;
   wherein the second members of the setting means being arranged to provide the setting function of one axis and a guiding function of another axis; and
   wherein the second members of the setting means being formed by three eccentric bolts which are settable in three set axes.

2. The arrangement according to claim 1 wherein one of the three eccentric bolts along a first axis can be displaced in one of the horizontal, forward and rearward directions, a second one of the eccentric bolts along a second axis can be displaced in one of the horizontal, right and left directions, and a third one of the eccentric bolts along a third axis can be displaced in the vertical direction and can be displaced in a radial direction.

3. The arrangement according to claim 1 wherein guiding pins are provided for guidance along one axis.

4. The arrangement according to claim 1 wherein clamping screws are provided for fixing the set axes.

5. The arrangement according to claim 1 wherein slots are provided for guidance for the adjustment in the various axes.

6. The arrangement according to claim 1 wherein the image display device is an LCD.

7. The arrangement according to claim 1 wherein parts of the setting mechanism are integrated into the housing and the setting means are arranged to provide the setting function of one axis and a guiding function of a further axis.

8. The arrangement according to claim 7 wherein the setting means can be used with one of mechanical, electromechanical, optical and optoelectrical means having a number of axes.

* * * * *